W. LANGMEIER.
INDICATOR AND CALIPER GAUGE FOR CANE MILLS.
APPLICATION FILED MAY 18, 1921.
1,421,504.
Patented July 4, 1922.
2 SHEETS—SHEET 1.
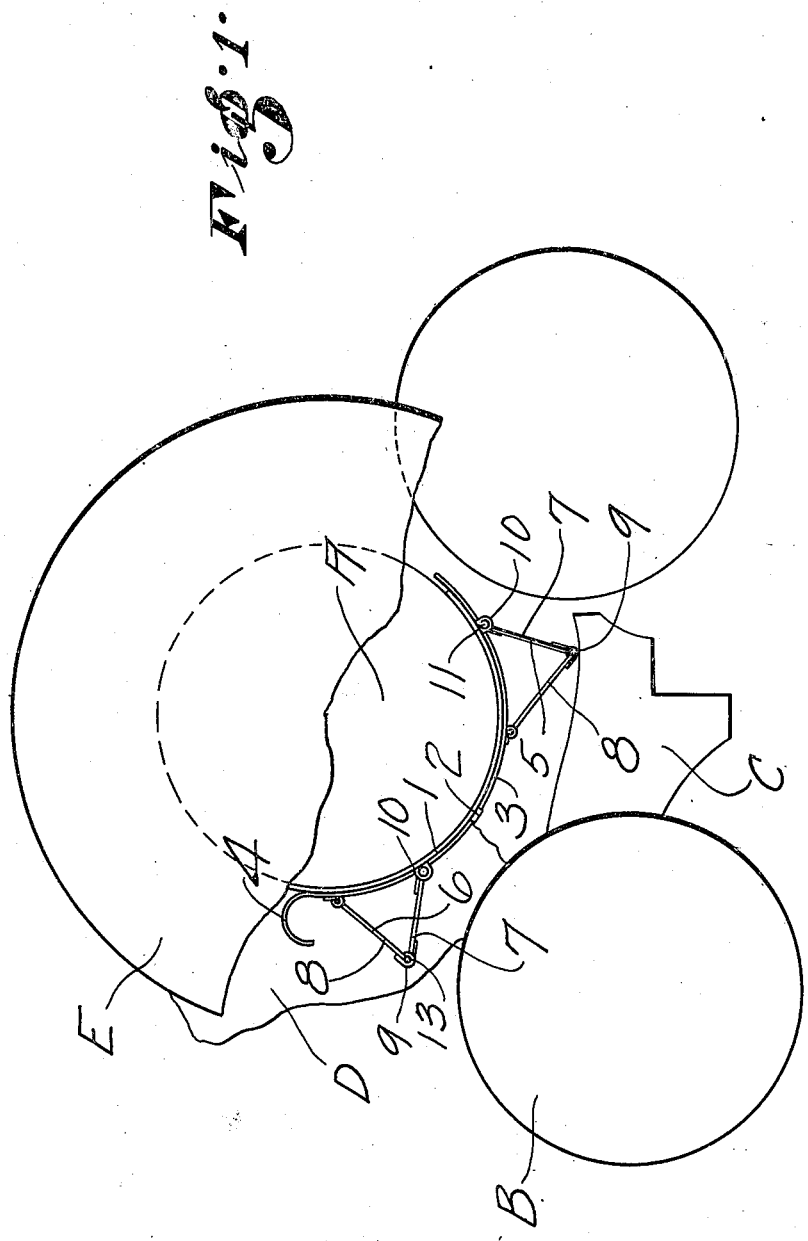

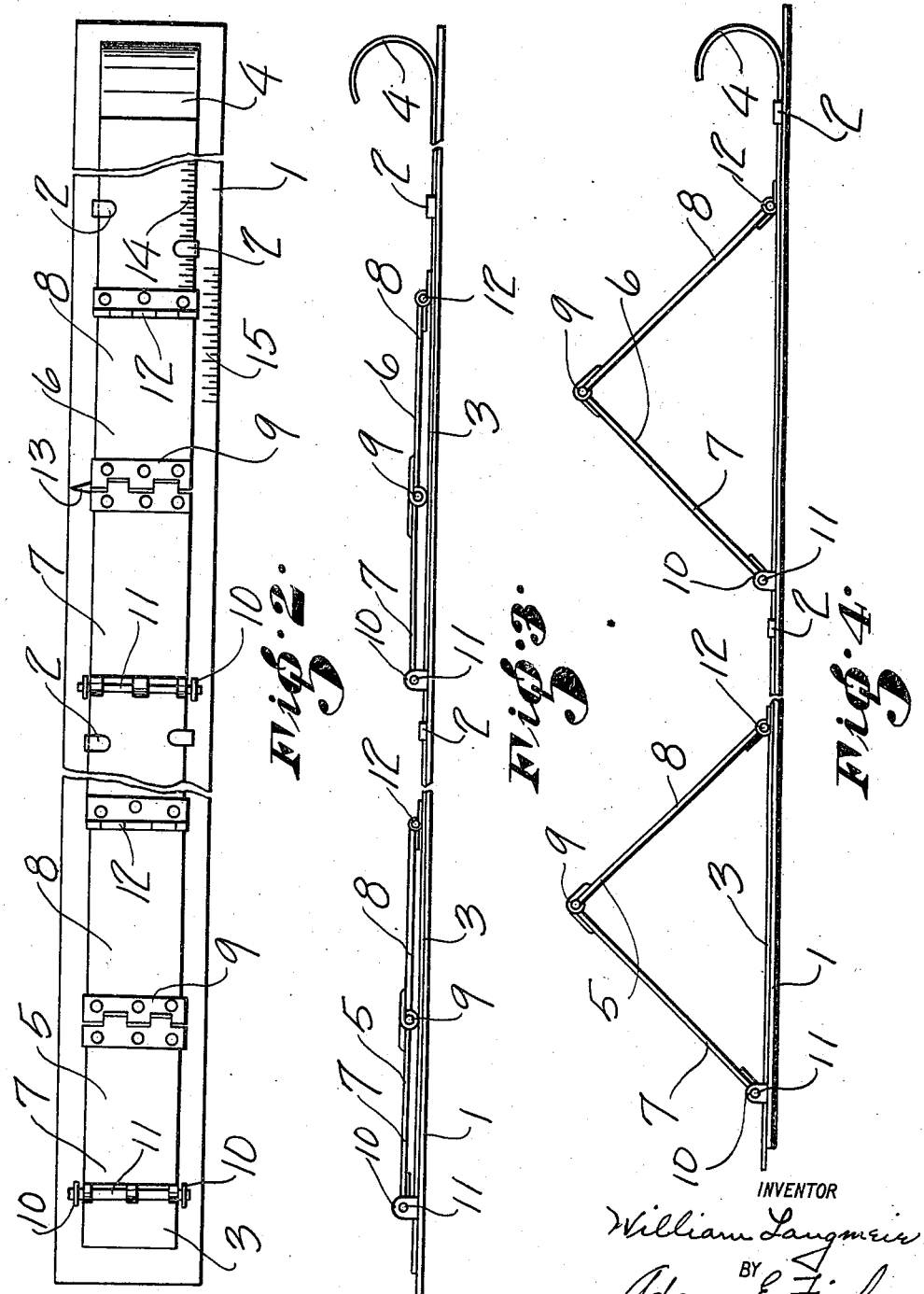

UNITED STATES PATENT OFFICE.

WILLIAM LANGMEIER, OF ST. LOUIS, MISSOURI.

INDICATOR AND CALIPER GAUGE FOR CANE MILLS.

1,421,504.  Specification of Letters Patent.  Patented July 4, 1922.

Application filed May 18, 1921. Serial No. 470,703.

*To all whom it may concern:*

Be it known that I, WILLIAM LANGMEIER, a citizen of the United States, residing in the city of St. Louis and State of Missouri, have invented new and useful Improvements in Indicator and Caliper Gauges for Cane Mills, of which the following is a specification, reference being had to the accompanying drawings.

This invention is an indicator and caliper gauge for the use of operators of cane mills in the crushing out of the juice of sugar cane. These mills ordinarily include in their construction what is known as a turn plate or trash knife, which frequently requires regauging and readjustment, but which is covered by the rollers in such manner as to necessitate dismounting the rolls from their bearings in order to properly gauge the turn plate. This is at present a tedious and expensive operation, and it is the main object of this invention therefore to provide a simple and efficient tool for gauging this turn plate, without dismantling the mill.

In the drawings—

Fig. 1 is a side elevation of a set of cane mill rolls, part of the flange of the top roll being broken away to show arrangement of the turn plate, and showing also the positioning of my indicator and gauge in respect of the turn plate and upper roll in the operation of regauging the said plate;

Fig. 2 is a plan view of the tool itself;

Fig. 3 is an edge view of the tool, showing the caliper arms folded close to the base strip;

Fig. 4 is an edge view showing the caliper arms elevated.

My invention consists of a thin flexible metal base strip 1, having retaining guide points 2 punched upwardly therefrom, the same remaining attached to the strip at their outer ends, and their free ends being slightly raised and bent inwardly to form the said guide points 2, which are adapted to slidingly receive and hold the superimposed indicator slide 3. This indicator slide 3 is likewise of thin flexible metal, but less in width than the base strip 1, so as to permit its being slidingly passed within the guide points 2 of the base strip. One end of the indicator slide 3 is turned up to form a handle 4. Two sets of hinged caliper arms 5 and 6 are mounted over the indicator slide 3 and at approximately opposite ends thereof. These sets of caliper arms 5 and 6 are each made of two relatively short, thin metal strips 7 and 8, equal in length and hinged together at 9, and having the ends of the strips 7 hinged to the base strip 1, and the ends of the strips 8 hinged to the indicator slide 3. The hinging to the base strip may be neatly accomplished by striking up ears 10 from the base strip and passing pins 11 through these ears and securing them to the ends of the strips 7 in any suitable manner. The hinging to the indicator slide may be made in a similar way or by any ordinary hinge, as 12. An indicator point 13 is extended from the hinge 9 of the set of caliper arms 6, the set nearest the handle 4.

In use, the indicator slide 3 is drawn back over the base strip 1 by pulling upon the handle 4, and this act folds the set of caliper arms 5 and 6 close to the base strip, as shown in Figure 3. The end of the tool opposite the handle is then passed down between the top roll A and the front roll B of the cane mill, the base strip 1 being turned up flat against the top roll. This brings the set of caliper arms 5 immediately over the turn plate C, and then by pressing forward on the handle 4, both sets of caliper arms, 5 and 6, are caused to spread out equally, until the hinge 9 of the inner caliper arms 5 strike against the surface of the turn plate C. Then by passing the caliper arms 5 back and forth over this turn plate, with the hinge 9 thereof always in contact with the plate, the distance of the surface of the turn plate C from the top roll A at all points is accurately registered by the caliper arms 5 and transmitted to the caliper arms 6, and by holding a strip of tracing paper D against the inside of the flange E of the roll A, and pressing the indicator point 13 against the paper, an accurate tracing is readily made, showing the gauge of the turn plate C relative to the top roll A. Thereafter any required readjustment of the turn plate C may be quickly made by manipulation of the usual screws and other elements provided for that purpose in standard mills. Calibrations 14 and 15 may be marked on the indicator slide and base strip respectively, to facilitate the use of the tool.

While I have herein described a certain specific method of constructing and assembling the elements of my invention, it is understood same may be varied in minor details, not departing from the spirit of my invention as defined in the appended claims.

I claim:

1. An indicator and gauge for the turn plate of cane mills, comprising a flexible base strip; a flexible indicator slide thereon and adapted to slide thereover and parallel thereto; and two sets of hinged caliper arms mounted over the indicator slide at opposite ends thereof, each set comprising two arms hingedly connected together at one end and having their other ends hingedly connected to the base strip and to the indicator slide, respectively, the two sets of caliper arms being thus adapted to spread and close equally as the indicator slide moves back and forth over the base strip.

2. An indicator and gauge for the turn plate of cane mills, comprising a flexible base strip and indicator slide mounted together to slide longitudinally one over the other; and two sets of hinged caliper arms mounted over the indicator slide at opposite ends thereof, each set comprising two arms hingedly connected together at one end and having their other ends hingedly connected to the base strip and to the indicator slide, respectively, the two sets of caliper arms being thus adapted to spread and close equally as the indicator slide moves back and forth over the base strip.

3. An indicator and gauge for the turn plate of cane mills, comprising two flat, flexible strips slidingly mounted together; a set of hinged caliper arms at each end of the connected strips, each set comprising two arms hingedly connected together at one end and having their other ends hingedly connected, one to each of said strips, so as to spread and contract equally under the sliding movement of the strips; there being calibrations marked on the strips as means for indicating the degrees of variation in the movement of the caliper arms.

4. An indicator and gauge for the turn plate of cane mills, comprising a flat, flexible base strip; a flat, flexible indicator slide mounted thereon for longitudinal sliding movement; hinged caliper arms at each end of the assembled base strip and indicator slide, each set of caliper arms being made up of two flat strips hinged together at one end and having their other ends hinged to the base strip and the indicator slide respectively.

5. An indicator and gauge for the turn plate of cane mills, comprising a flat, flexible base strip; a flat, flexible indicator slide mounted thereon for longitudinal sliding movement; hinged caliper arms at each end of the assembled strips, each set of caliper arms being made up of two flat strips hinged together at one end and having their other ends hinged to the base strip and indicator slide respectively; there being contiguous sets of calibrations on the base strip and indicator slide as means for registering the movements of the caliper arms over the turn plate.

WILLIAM LANGMEIER.

Witnesses:
  JAMES DUNCAN,
  CHESTER L. ENDER.